US012128319B2

(12) United States Patent
Abecassis

(10) Patent No.: US 12,128,319 B2
(45) Date of Patent: *Oct. 29, 2024

(54) GAMING INTERFACE AND SYSTEMS AND METHODS FOR PROVIDING SAME

(71) Applicant: Riot Games, Inc., Los Angeles, CA (US)

(72) Inventor: David Abecassis, Los Angeles, CA (US)

(73) Assignee: Riot Games, Inc., Los Angeles, CA (US)

( * ) Notice: Subject to any disclaimer, the term of this patent is extended or adjusted under 35 U.S.C. 154(b) by 240 days.

This patent is subject to a terminal disclaimer.

(21) Appl. No.: 17/868,316

(22) Filed: Jul. 19, 2022

(65) Prior Publication Data

US 2022/0347586 A1 Nov. 3, 2022

Related U.S. Application Data

(63) Continuation of application No. 17/135,459, filed on Dec. 28, 2020, now Pat. No. 11,389,732.

(60) Provisional application No. 62/954,367, filed on Dec. 27, 2019.

(51) Int. Cl.
*A63F 13/00* (2014.01)
*A63F 13/35* (2014.01)
*A63F 13/795* (2014.01)
*A63F 13/822* (2014.01)

(52) U.S. Cl.
CPC ............ *A63F 13/795* (2014.09); *A63F 13/35* (2014.09); *A63F 13/822* (2014.09); *A63F 2300/5566* (2013.01); *A63F 2300/807* (2013.01)

(58) Field of Classification Search
CPC ........ A63F 13/798; A63F 13/32; A63F 13/46; A63F 13/48
See application file for complete search history.

(56) References Cited

U.S. PATENT DOCUMENTS

| | | | |
|---|---|---|---|
| 8,414,387 B1 * | 4/2013 | Paradise | G07F 17/3225 463/25 |
| 11,065,547 B2 | 7/2021 | Lin et al. | |
| 2012/0225724 A1 * | 9/2012 | Barber | G07F 17/3276 463/42 |
| 2014/0045589 A1 * | 2/2014 | Paradise | A63F 13/352 463/29 |

* cited by examiner

*Primary Examiner* — Milap Shah
*Assistant Examiner* — Eric M Thomas
(74) *Attorney, Agent, or Firm* — Shook, Hardy & Bacon L.L.P.

(57) ABSTRACT

Disclosed are new and innovative methods and systems for coordinating a game having a plurality of players. One of the methods comprises: enabling each of the plurality of players to create a team of champions; and creating a one or more real-time battles between a plurality of human players.

20 Claims, 15 Drawing Sheets

GAMING INTERFACE AND SYSTEMS AND METHODS FOR PROVIDING SAME

CROSS-REFERENCE TO RELATED APPLICATIONS

This application is a continuation of prior application Ser. No. 17/135,459 (filed Dec. 28, 2020), which claims the benefit of U.S. Provisional Application No. 62/954,367 (filed Dec. 27, 2019). Each of application Ser. No. 17/135,459 and Application No. 62/954,367 is incorporated herein by reference in its entirety.

BACKGROUND

Autobattler (also known as auto chess) is a new video game genre that has quickly taken the gaming community by storm. In less than a year, several autobattler games have been released to meet growing demands. At a high level, autobattler games are tactical strategy games that have players play the role of a team manager and tactician. To win, a player must build a strong team across several rounds of a match. A player can buy, upgrade, and sell characters (e.g., units, heroes, champions) every round and deploy those characters into a tactical formation for battle, and equip them with powerful items. Each of these decisions must be made strategically.

In general, players start an autobattler match with an empty board and build their team from scratch. As the match progresses, players can build a larger team and have more characters on the board. Part of the strategy is character placement, which can determine the outcome of a battle. For example, it is generally a good idea to place a defensive character in front of a non-defensive (e.g., offensive) character.

The most popular autobattler game in the autobattler genre is Riot Games' TeamFight Tactics ("TFT"), which has characters (e.g., champions) based on the popular League of Legends universe. Disclosed herein are new and innovative features first introduced in TFT.

SUMMARY

Provided herein are embodiments of systems and methods for conducting one or more game sessions having autobattler features and/or for matching players in an online game. One of the systems comprises a memory and one or more processors coupled to the memory. The one or more processors of the system is configured to: select a first and a second player from a plurality of human players, wherein each of the plurality of human players has a home arena; designate a home arena of the first player as a host arena; and create a battle matchup between the first and second players on the host arena.

When the number of players is an odd number, the system is configured to match the odd player with a duplicate army of one of the plurality of human players. The match between the odd player and the duplicate army can be on a home arena of the odd player.

The system can also generate an avatar for each player that can be moved around the host arena by the player. Each player can perform various actions with the avatar such as a cheer, a taunt, and/or a show of respect (e.g., a bow, a thumb up) for the other player.

One of the methods for creating an autobattler match in an online game includes: selecting a first and a second player from a plurality of human players; designating a home arena of the first player as a host arena; and creating a battle matchup between the first and second players on the host arena. In some embodiments, each of the plurality of human players has a home arena that can be customized by each of the player.

The method further includes creating a match between an odd player in the game and a duplicate army of one of the plurality of human players. The match between the odd player and the duplicate army can on a home arena of the odd player.

The method also includes generating an avatar for each player that can be moved around the host arena by the player. Additionally, the method includes enabling the players to perform various actions with their avatars such as a cheer, a taunt, and/or a show of respect for the other player.

A second-described method for creating an autobattler match in an online game includes creating a battle matchup between a first and second player on a home arena of the first player; and generating a first and second avatar for the first and second players, respectively. The first and second avatars can be moved around the home arena by the first and second players, respectively.

Also disclosed is a third-described method for coordinating one or more pair-matched battles. This third method includes: enabling each of a plurality of players to create a team of champions; and creating one or more real-time battles between a plurality of human players, wherein each of the plurality of human players controls a team of champions, and each real-time battle is on the home arena of one of the players. One or more champions from the team of champions can be selected (by each player) from a list of champions.

The one or more real-time battles can comprise four pair-matched battles, each battle involving two human players. A pair-matched battle is a battle between two human players occurring in real-time on one of the players' home arena where each of the human players is controlling his/her non-cloned (e.g., non-duplicate) team of champions. In other words, a pair-matched battle is between two non-cloned teams of champions, each team is controlled by a human player. A cloned team is a duplicate of a team resulting in a human player having two or more teams of champions in the game with each team at a different location or arena. A game can have many simultaneous battles. If a player only has one team of champions in a game, by definition that team is a non-cloned team. In each game, at least two of the one or more battles can occur simultaneously. In some embodiments, all battles can occur simultaneously.

If the one or more battles comprises an odd number of real-time battles, the odd battle (e.g., 7th battle) having an unpaired human player is between the unpaired human player and a duplicate team of champions of one of the plurality of players.

The home arena can be a unique arena for each of the plurality of human players, which can be designed and/or customized by each player. The arena can be customized before the start of the match. In some embodiments, the arena can be customized at various points of the match (e.g., after each round).

Also disclosed is a second-described system for coordinating an online game, the second system comprising: a battle generation module configured to create a one or more real-time battles between a plurality of human players, wherein each of the one or more real-time battles is on a home arena of one of the plurality of human players. A home arena of a player can be an arena selected and/or designed by the player. The home arena can be selected before the start of the game or at any time during the game. Each player can have a unique home arena.

Also disclosed herein is a fourth-described method for previewing a combined item and/or manipulating one or more in-game items. The fourth method comprises hovering a first in-game item over an in-game character; and displaying an information window having information about a combined item or an effect that would have been generated if the first in-game item is dropped onto the in-game character. The fourth method further comprises dropping the first in-game item onto the in-game character; and generating the combined item or effect without having the in-game character to first equip the first in-game item. An effect can be an attribute enhancement such as, but not limited to, a defense or an attack bonus.

Also disclosed herein is a fifth-described method for manipulating one or more in-game items. The fifth method comprises hovering a first in-game item over a second in-game item; and displaying an information window having information about a third in-game item that would be generated when the first and second in-game items are combined. The fifth method further comprises dropping the first in-game item on top of the second in-game item; and generating the third in-game item such that a player can interact with the third in-game item, wherein the third in-game item is generated without having to equip the first or second in-game item onto an in-game character (e.g., champion).

The fifth for manipulating one or more in-game items further comprises dragging the third in-game item over to the in-game character; and displaying a second information window having information about an enhanced ability of the in-game character if the character is to equip the third in-game item, wherein the second information window is displayed without having to equip the third in-game item onto the in-game character.

The enhanced ability comprises one or more of an enhanced weapon ability, an enhanced magic ability, an enhanced skill ability, a weapon upgrade, a magic upgrade, or a skill upgrade, etc. The information window can be a semi-transparent window, a transparent window, or an opaque window. The first and second in-game items can be a weapon, an object, an attribute (e.g., stamina, health, mana) modifier, an armor, or a combination thereof Also disclosed herein are embodiments of systems and methods for manipulating one or more in-game items using a graphical interface. The sixth-described method comprises: selecting a first in-game item using the graphical interface; dropping a first in-game item on top of a second in-game item that is displayed on the graphical interface; and generating a third in-game item such that a player can interact with the third in-game item using the graphical interface, wherein the third in-game item is generated without the first or second in-game item being equipped by an in-game character.

Also disclosed is a third-described system for manipulating one or more in-game items on a graphical interface. The third system comprises a memory and one or more processors coupled to the memory. The one or more processors are configured to: hover a first in-game item over a second in-game item; and display an information window having information about a third in-game item that would be generated when combining the first and second in-game items.

Also disclosed is a seventh-described method for performing a shared-draft that enables players to select one or more champions to build a team. The seventh method comprises displaying a group of players in a first lineup on a display; displaying a group of selectable champions in a second lineup on the display; allowing a first player from the group of players to select a champion from the group of selectable champions based at least on one or more attributes of the first player; and allowing a second player, after the first player has selected a champion, from the group of players to select a champion from the group of selectable champions based at least on one or more attributes of the second player. The first lineup can surround the second lineup partially or fully. The selectable champions of the second lineup can move around, such as in a circular fashion as a group. Each of the first and second lineups can be a circle, a polygon, a square, or a rectangle. The second lineup can be outside of the first lineup. The second lineup can partially or fully surround the first lineup.

Also disclosed is a fourth-described system for performing a shared-draft that enables players to select one or more champions to build a team, the fourth system comprises a memory and one or more processors coupled to the memory. The one or more processors can be configured to: display a group of players in a first lineup on a display; display a group of selectable champions in a second lineup on the display; allow a first player from the group of players to select a champion from the group of selectable champions based at least on one or more attributes of the first player; and allow a second player, after the first player has selected a champion, from the group of players to select a champion from the group of selectable champions based at least on one or more attributes of the second player.

Other features and advantages of the present invention will be or will become apparent to one with skill in the art upon examination of the following figures and detailed description, which illustrate, by way of examples, the principles of the present invention.

BRIEF DESCRIPTION OF THE DRAWINGS

The foregoing summary, as well as the following detailed description, is better understood when read in conjunction with the accompanying drawings. The accompanying drawings, which are incorporated herein and form part of the specification, illustrate a plurality of embodiments and, together with the description, further serve to explain the principles involved and to enable a person skilled in the relevant art(s) to make and use the disclosed technologies.

Figure 1A:
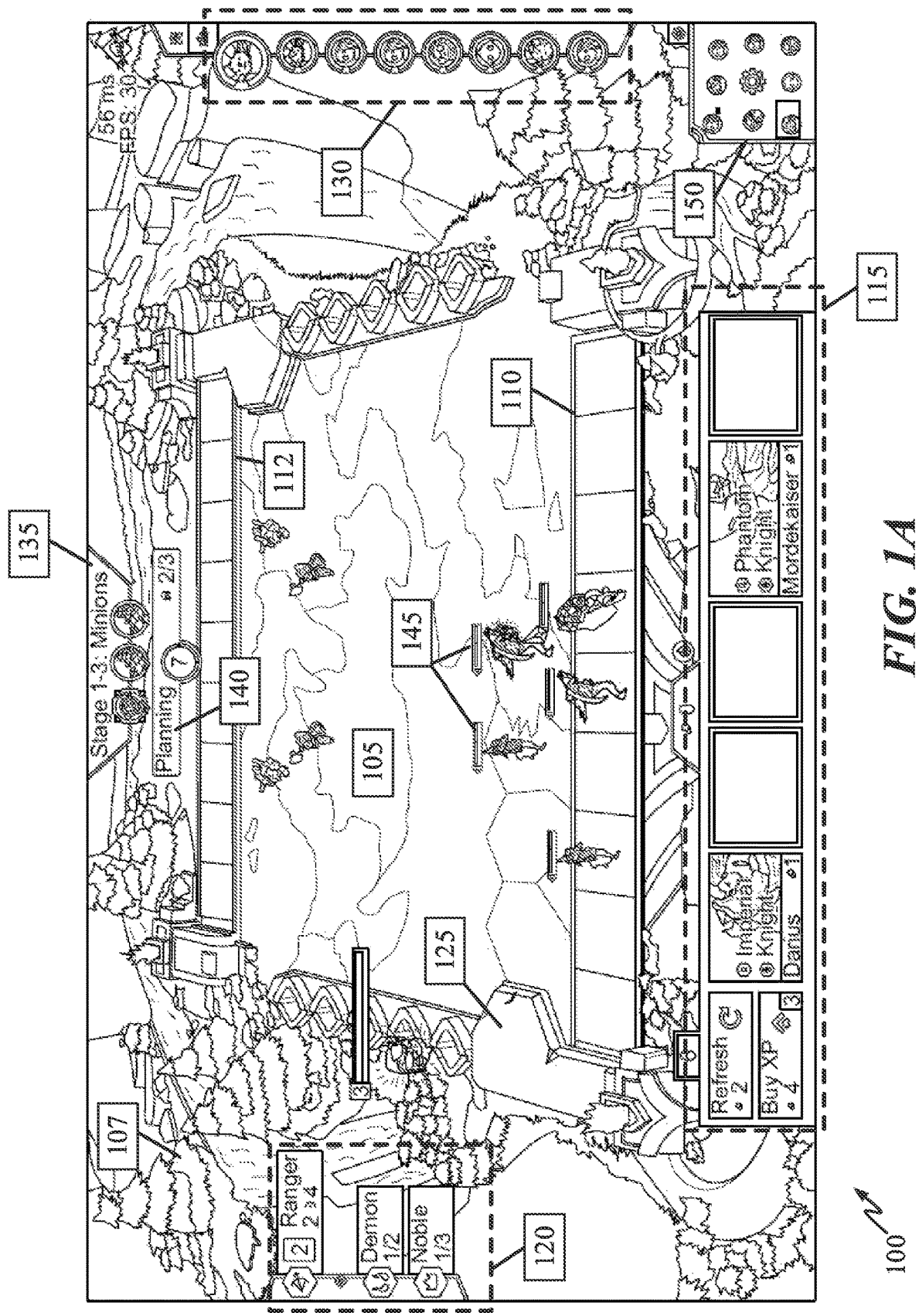
FIGS. 1A, 1B, 1C and 1D are example graphical interfaces of a game in accordance with some aspects of the disclosure.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable, similar or like reference numbers may be used in the figures to indicate similar or like functionality.

DETAILED DESCRIPTION

Disclosed herein is an interactive gaming environment of a turn-based game with innovative interfaces and features to make the turn-based game engaging, exciting, innovative, efficient, and intuitive. The disclosed turn-based game (hereinafter can be referred to as "the game") is a free for all game that pits players against each other until a single winner remains. Each game can have up to eight players. In each game, players can acquire gold to purchase champions during various stages of the game (e.g., planning and battles stages) to build a team. Throughout the game, the player's team can become more powerful as the player drafts champions that share origins and classes to unlock trait bonuses. The player can also combine three duplicates of the same champion to upgrade the champion's star level. For example, three identical one-star level champions will create a two-level copy of that champion. A two-star champion has better attributes such as, but not limited to, health, attack damage, and defense than a one-star champion. Similarly, three identical two-star champions can be combined to create a three-star champion.

Other innovative features include methods for intuitive item combinations to create new in-game items. The new and innovative item combination feature eliminates the need to bring up an inventory page belonging to a player (or a champion), equip and/or hold two or more items selected from the inventory page, and combine the equipped items. Items can be combined at various stages of the game (e.g., planning stage, battling stage). Even in the planning stage, time is limited. For example, the planning stage can last 30 seconds or less. During this limited timeframe, players must finish buying, selling, trading, and/or equipping items on champions. Time is even more limited and essential during the battling stage as the opposing team will not wait for a player to figure out a strategy for an item combination. Thus, the conventional ways of creating a new item, e.g., by opening an inventory screen, equip/hold two or more items from the inventory screen, and then combine the equipped items, are too tedious and inefficient to be effective—especially during a synchronous battle. A battle could easily be lost while a player spends time finding desired items from the inventory page and then equip and combine them. Accordingly, a new and more efficient way is needed to perform item combinations during an active real-time battle.

Additionally, an item can be combined with an already equipped item simply by dragging and dropping the item over to the champion with the equipped item. This will create a new equipped item (e.g., cursed blade or Warmog's armor) or a new effect (e.g., ionic spark or red buff) for the champion immediately without having to open up an intermediate inventory screen.

Each of the multiple players in the game can have an arena (e.g., a battle environment) that is unique to each respective player. The game can have a total of eight players. In some embodiments, the game can have more than eight players. The interactive gaming environment can include an arena mini-map that enables each player to select and view the other player's arena unique design and/or layout and any battle currently in progress on the selected arena. The arena mini-map provides an efficient way for a player to observe an in-progress battle between two other players in the same game as a spectator. The player can select and observe another player's arena and any battle thereon simply by selecting the unique icon in the arena selection area for that particular player. In some embodiments, the arena mini-map can have eight different icons arranged within a square box. The different icons can also be arranged within another shape such as a circle, a hexagon, or an octagon. Each icon can have the same color scheme of the arena for that particular player. Each player can be represented by an avatar, which can also be displayed in the arena mini-map.

Battles between two players can be automatically arranged by a battle generation module (see 815 of FIG. 8), which can match players randomly or based at least on one or more attributes of each player. For example, the battle generation module can match a first player with a second player based at least in part on the one or more attributes of the first player and/or the second player. The one or more attributes can be a player's personality score such as, but not limited to, a leader score, a teammate score, a sportsmanship score, a mentor score, and an aggression score. The battle generation module can also match a first player with another player based on a degree of connection between two players. Players that have a first degree of connection with the first player can be matched first. Next, players with a second degree of connection with the first player can be considered after the availability of players with a first degree of connection has been exhausted. Lastly, players with a third degree of connection with the first player can be considered. A first degree of connection exists when two players have mutually commended each other in one or more previous games. A second degree of connection exists between a first player and a third player when i) the first player commended a second player; and ii) the second and the third players have mutually commended each other in a previous game. A third degree of connection exists between a first player and a third player when a second player with second degree connection with the first player commends a third player in a previous game. Other battle matching processes are described in detail in U.S. patent application Ser. No. 15/706,551, entitled "Systems and Methods That Enable Player Matching For Multi-Player Online Games," filed on Sep. 15, 2017, which is hereby incorporated by reference in its entirety.

The battle matching and selection process can have a playoff (elimination) structure until a single player is victorious by being the last team of champions standing or the team of champions with the highest score. The game can have four or more players at the start of the initial battle round (round 1). For example, if there are eight players, then four different synchronous battles can be automatically arranged by the automatic battle creation module, which can randomly match players or can match players based at least on one or more attributes of the player's team (e.g., ranking, records, team composition). A synchronous real-time battle is a battle between two human players occurring at real-time. If there is an odd number of players in the game, a human player and his champions will battle against cloned champions of a team (e.g., ghost team or army) of another human player.

Once the game starts, a shared-draft round can be conducted immediately. This is when a player can pick his/her first champion from a carousel of champions. The shared-draft round can also be conducted after several pair-matched battles. For example, a shared-draft round can occur after every three or four pair-matched battles. A pair-matched battle is a battle between two human players occurring in real-time on one of the players' home arena. A carousel of champions is a platform in which draftable champions are placed in the center of the platform and players are placed on the outside surrounding the draftable champions. In a carousel like fashion, draftable champions can move (e.g., walk, rotate) about the platform such that the position of each champion relative to a player is constantly changing. In some embodiments, the draftable champions can rotate in a circle. The layout of the platform can be reversed with draftable champions on the outside surrounding the players on the inside of the platform.

Before the drafting process starts, each player is imprisoned by a barrier that prevents players from moving. The barrier can be a physical, an invisible, or an energy barrier. In some embodiments, the barrier can be an energy barrier. Once the energy barrier opens for a player, the player can then run to the desired champion and touch it to draft it. Care must be given when running to the desired champion, as the first champion the player touches will be the drafted champion. There are no do-overs. The energy barrier that is imprisoning the player can open based at least on an attribute (e.g., health, experiences, gold) of the player. Health and experiences are dictated by the player's performance in one or more previous battles. The energy barrier can be a circle, a square, a rectangle, a polygon, or any other suitable shape.

The energy barrier can also open based on players' past performances such as a losing or winning streak. In some embodiments, the energy barriers of players having the lowest health will open first. This allows players that did not do well in previous battles a chance to make a comeback. To add hysteresis, chance, and luck to the drafting process, champions in the carousel are constantly moving (e.g., rotating in a circle) while the players remain stationary. This means the desired champion may be far away when a player is free to move to that champion. And because the desired champion may be far away, another player that is closer to the desired champion can get to the desired champion first. More detail on the team drafting process will be provided below with respect to FIG. 6A.

Once the players are finished recruiting their team, a planning stage can follow. The planning stage allows the players to view and purchase the champions available in the store. The planning stage also provides a brief period for the player to strategize, select, and place their champions at various locations on the battlefield. Once the planning stage is over, multiple and simultaneous synchronous battles can commence, which can be observable by selecting a host's arena using the arena mini-map of the interactive gaming interface.

After the battles between the players are arranged, the visiting players are transported to the arenas of the host players. During combat, the champions of each team will move, attack, and cast spells automatically. At the end of each round, each player earns some gold based at least on the player's performance (e.g., number of champions survived, number of damage inflicted, winning streak, losing streak). Gold can also be earned from interest on the number of gold generators in the player's possession. Gold can be used to purchase more champions from the store or to buy experience points to level up faster. The store can show a randomized list of available champions that the player can purchase with the player's gold. The player can also spend gold to refresh the store, which provides a new list of purchasable champions.

FIG. 1A illustrates an interface 100 in accordance with some embodiments of the present disclosure. Interface 100 includes a battlefield (e.g., arena) 105, battle staging areas or benches 110 and 112, a store 115, a trait tracker 120, an inventory area 125, a scoreboard 130, a round indicator 135, a stage indicator 140, champions 145, and a mini-map 150. Interface 100 can have a different design for each player. For example, the patterns and/or color of arena 105 can be different for each of the players. Additionally, background landscape 107 can also be different. In some embodiments, the players can design and generate their own arena 105 and landscape 107. Although not shown, arena 105 can have elevation changes (e.g., hills and valleys) and landscape features such as rivers, lakes, forests, and deserts. In some embodiments, the player can spend gold to purchase a customizable arena such that various landscape features can be added, modified, and/or deleted. Arena 105 can also have selectable themes such as a trireme or war galley theme, a moon-base theme (e.g., a base on the moon), a volcano-base theme, an airship theme, etc. Each arena theme can be purchasable with gold or can be awarded once the player obtains certain achievements. In some embodiments, a player can spend gold to activate a feature of arena 105 that can provide an advantage for the home team. For example, a mountain or a fort that would provide defensive bonuses to a champion can be purchased with gold earned during the game.

Benches 110 and 112 are staging areas for champions of both teams. Bench 110 is located at the bottom of arena 105. Bench 110 houses champions for the team of the local player, that is the player locally interacting with the interface 100. In other words, from the local player perspective, interface 100 as shown in FIG. 1 is what the local player sees.

Bench 112 is located at the top of arena 105 and houses champions of the team for the remote player. In this way, from any player perspective, his/her team is always shown on the bottom. A remote player is the player competing with the local player. The remote player can be a human player or it can be a clone of a human player's team for scenarios with an odd number of players. For example, a game can start even though there is an odd number of players in the game. In this scenario, a team can be automatically generated using a duplicate of one of the human player's team. In this way, the game can proceed without delay.

Store 115 displays a list of additional champions that the user can purchase during various stages of the game (e.g., the planning stage, battling stage). For example, during the planning stage, the player can buy one or more new characters (e.g., Zed, a ninja assassin). If the player has three of the same champion (Zed), an automatic character boost will occur. Three normal or one-star level Zeds will become a two-star level Zed. Similarly, three two-star level Zeds will be combined to create a three-star level Zed. In another example, if there are two one-star level Lucians (a gunslinger) on bench 110 and the player purchases another Lucian from store 115, then the three one-star level Lucians will create a two-star level Lucian.

Stage indicator 140 shows the current stage of the game, which can have four main stages: a planning stage, a battling stage, a post-battling stage where scores and gold can be calculated and awarded, and a drafting stage. Champions can also be sold and purchased during the battling stage. For example, during a battle, a champion can be sold by dragging and dropping the champion to store 115. To purchase a champion from store 115, the champion can be dragged onto bench 110.

At various stages of the game (e.g., planning stage and battling stage), players can purchase additional champions from store 115. The type of champions in store 115 for each player can be random. However, each player can spend more gold to refresh the list of available champions that can be purchased from store 115. In some embodiments, the champions displayed in store 115 for all players come from a common deck (e.g., list). Each store 115 of each player can show four champions from the common deck at a time. If a player does not like the list of champions shown in their respective store 115, the player can spend gold to refresh or randomize a new list of champions from the common deck.

Once a champion is purchased, it will be placed into one of the slots on bench 110. The local player can also see purchasing activities of the remote player by observing for activities on the remote player's bench 112. In some embodiments, items can also be purchased from store 115. Purchased items can be displayed in the inventory area 125. Champions and/or items from store 115 can be purchased by clicking, dragging, and dropping the champions and/or items onto bench 110 and/or inventory area 125.

As previously mentioned, a champion can also be sold from bench 110 by dragging it to store 115. If a champion is sold with one or more equipped items, the equipped items will automatically appear in inventory area 125.

Each champion has an origin and a potential class bonus for which the champion can be qualified. This data can be shown on trait tracker 120. Using trait tracker 120 as a guide, a player can quickly develop strategies for champions on her team.

Inventory area 125 displays items such as weapons, supplies, trinkets, and other game items that are either purchasable or dropped by monsters or champions in the game. Each dropped item can be represented by a unique graphical icon. If an item is dropped (or appeared) on arena 105, it can be picked up by clicking and dragging the item icon to area 125. In some embodiments, double clicking an item on arena 105 can also cause the item to appear in inventory area 125. Discussions of item manipulation and combinations are provided below.

Scoreboard 130 displays all of the players competing in the current game along with players statistics such as scores and health. Each player can have a unique icon in scoreboard 130. The players can be listed in order by current ranking, health, or class in scoreboard 130. In some embodiments, players are shown by current ranking with the highest scoring player being on top and the lowest scoring player being on the bottom.

Figure 1B:
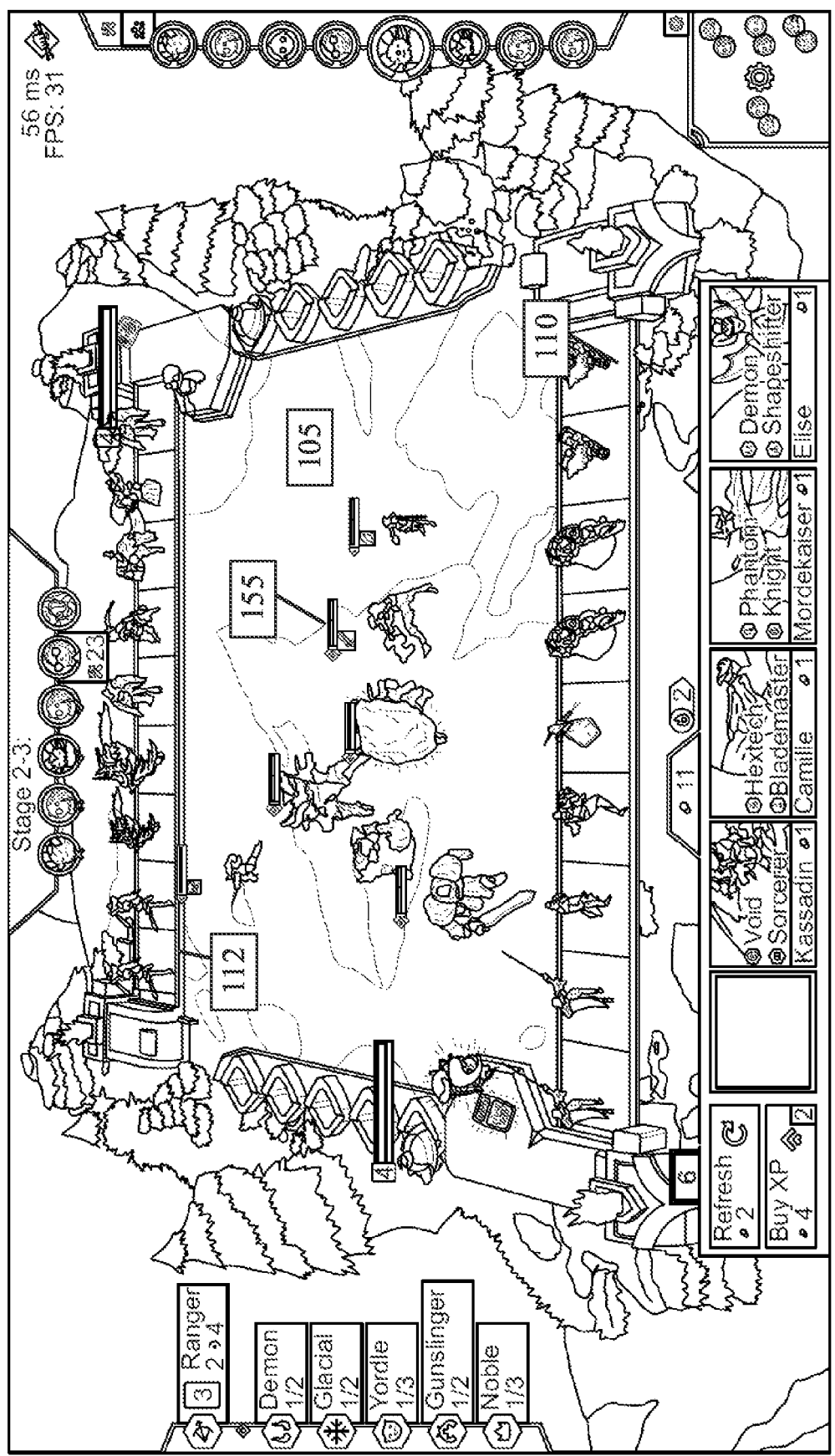

FIG. 1B illustrates a real-time battle between two players. Each player has champions on the bench (e.g., bench 110 or 112) and on arena 105. Each champion can also have a stats indicator 155 that can show various attributes such as health, stamina, mana, and item(s) equipped. A battle is over once all champions of a team are defeated or one of the players surrenders.

Figure 1C:
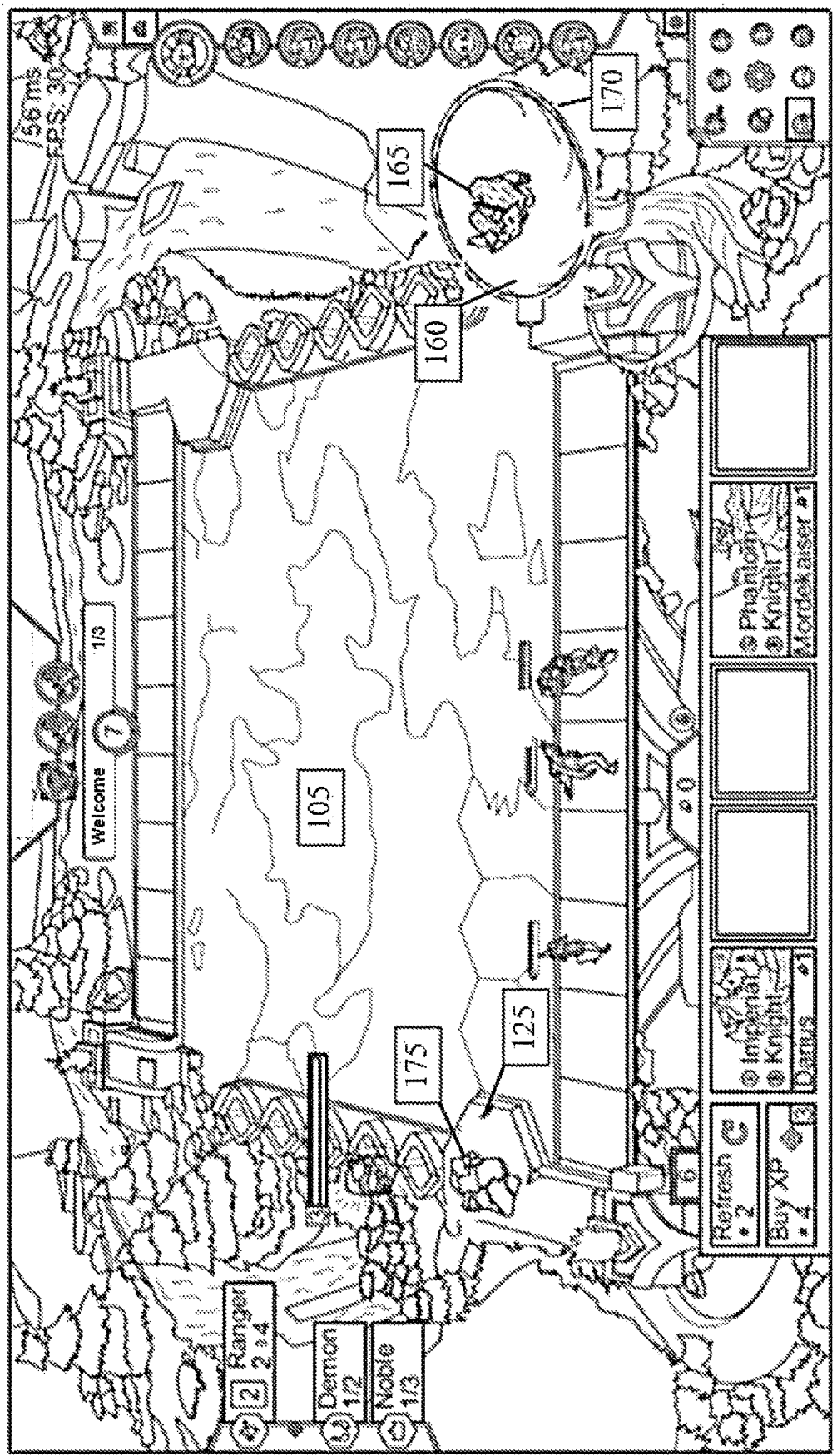
Figure 1D:
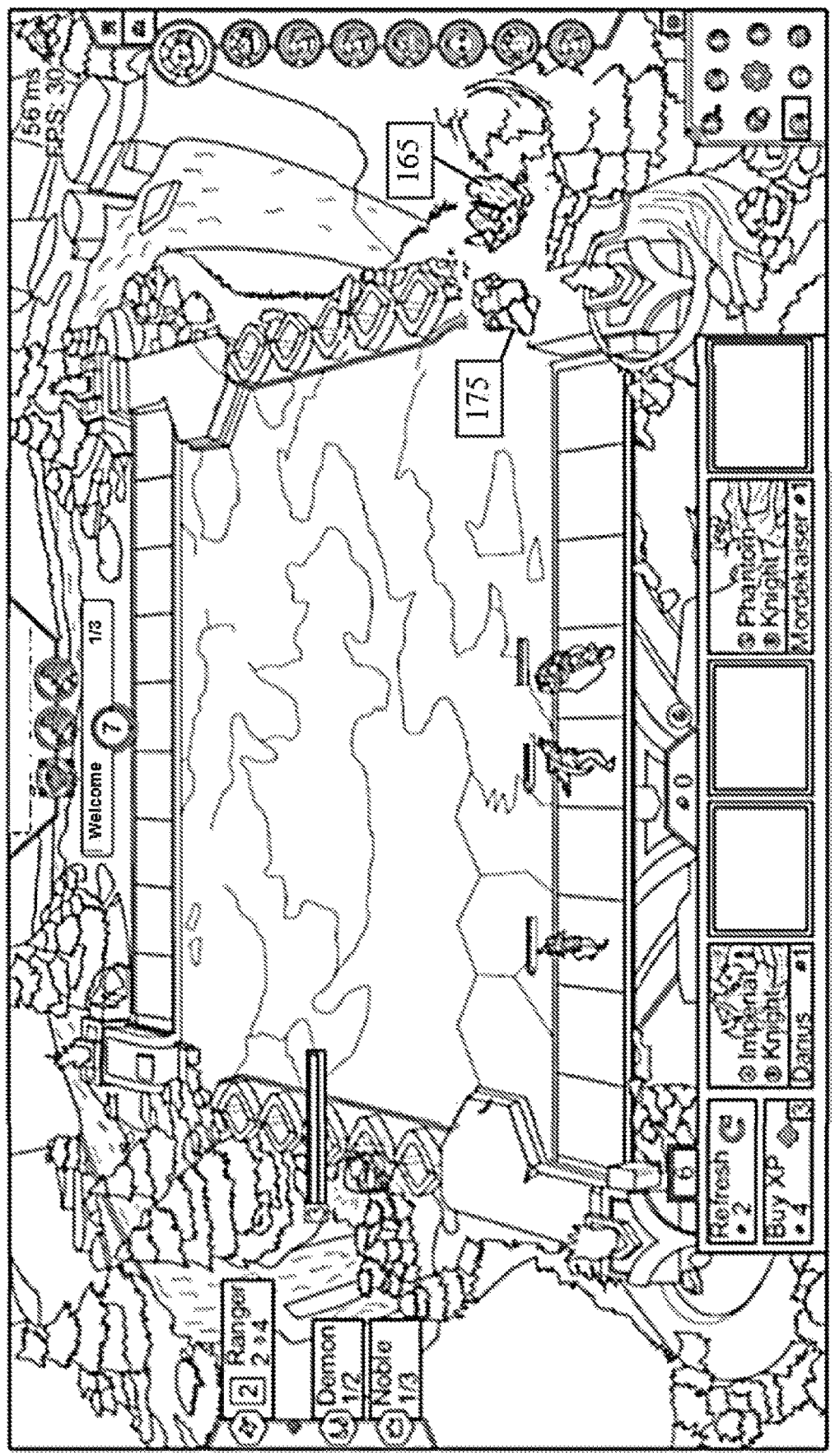

FIGS. 1C and 1D illustrate interface 100 with a waiting area 160 in accordance with some embodiments of the present disclosure. Prior to the start of a battle between two players, the visiting player's avatar 165 can placed in waiting area 160, which can be located near the lower right side of arena 105. Waiting area 160 can be located anywhere on interface 100 such as the upper left or right corner of arena 105. In some embodiments, waiting area 160 can be located at an area outside of interface 100 such as an in-between world (e.g., a wormhole, a waiting lobby, a neutral zone). Waiting area 160 can be surrounded by a barrier 170, which can be an energy barrier, a physical barrier, or an invisible barrier. In some embodiments, avatar 165 can only move within barrier 170 of waiting area 160 until avatar 175 of the home player move into waiting area 160 to invite the visiting player (e.g., avatar 165) onto arena 105.

Avatar 175 of the home player can be placed near or on inventory area 125, which can also serve as the home base for avatar 175. From the home base, the home player can control avatar 175 and move it to waiting area 160 in order to interact with avatar 165 (see. FIG. 1D). In some embodiments, avatar 175 can remove barrier 170 by interacting with avatar 165 and/or barrier 170. This effectively invites the visiting player onto home arena 105. Once invited onto arena 105, the army of the visiting player can be transported onto arena 105 and/or bench 112.

In embodiments where waiting area 160 is located on an in-between world (e.g., a neutral zone, a waiting lobby), a wormhole (not shown) can appear in arena 105 that allows avatar 175 of the home player to visit the in-between world. Once avatar 175 traveled to waiting area 160 of the in-between world, avatar 175 can invite (e.g., bring back) avatar 165 of the visiting player to home arena 105. Other means of transporting avatar 175 to the in-between world such as using a magic stair, a magic portal, or a magic teleportation spell/effect are contemplated and are within the scope of the present disclosure.

The waiting area and the invitation aspect of the game enables players to interact with each other actively while cultivating positive social interactions between the two players. Because the visiting player has to be invited onto the home player's arena before a battle can begin, players are indirectly encouraged to have a cordial relationship. This in turn can greatly increase the overall satisfaction and experience of the game.

Figure 2A:
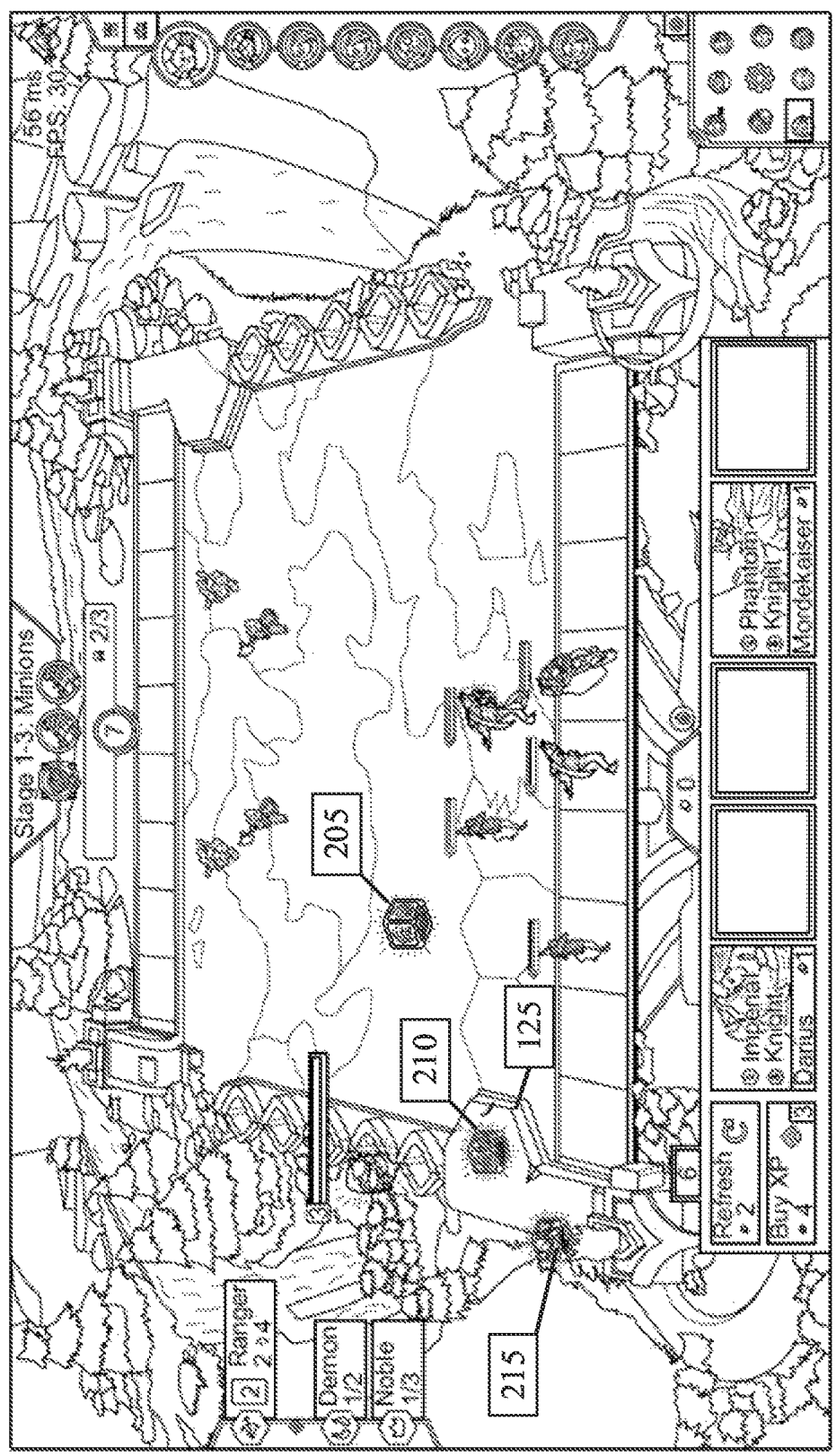
FIGS. 2A and 2B illustrate how in-game items can be manipulated in accordance with some aspects of the disclosure.
Figure 2B:
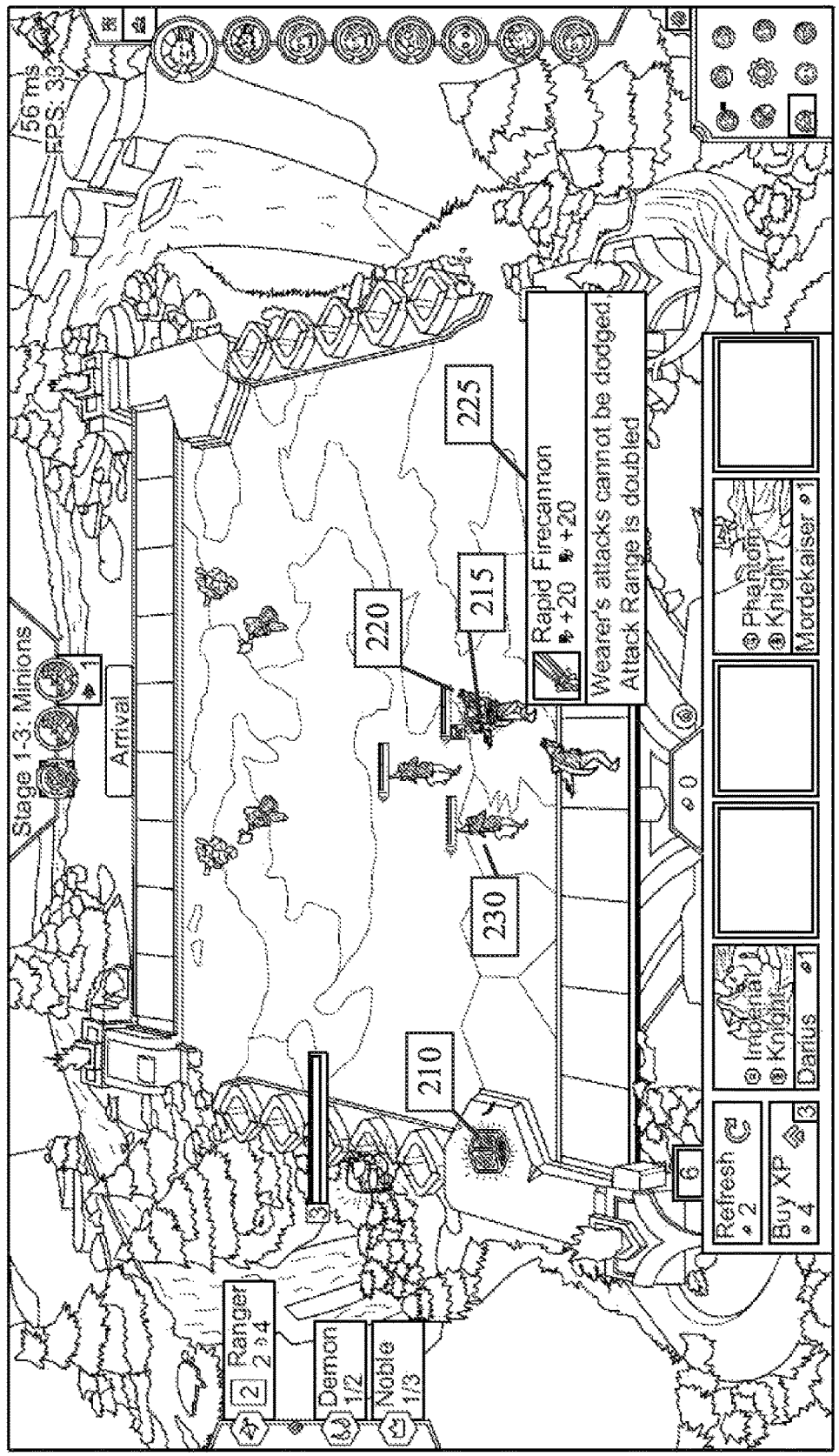

FIGS. 2A-2B illustrate an item preview process that enables in-game items to be quickly equipped and/or combined in a fast and efficient manner such that the flow of the battle is not interrupted. A conventional way of equipping and/or holding an item in a game is to first select a character, open the inventory bag for that character, find the item that the user wants to equip, and then finally equip the item. If a user wants to combine items or weapons, then more steps are required such as finding a second item (that is needed for a combination), holding the second item, and then combining the second item with the already equipped first item. During a real-time battle, by the time you find the appropriate item, equip it, and/or combine it with another item, the character could be gravely injured or dead because of the time required to do all of those tasks. Additionally, conventional methods of combining items (e.g., upgrading a weapon by combining it with another item) requires another window (e.g., inventory window) to pop up that substantially blocks the view of the main interface. This is simply untenable during real-time combat with another player (e.g., PvP).

The disclosed new and innovative methods and interfaces to combine items eliminate several of the steps described above. The result is a seamless way to combine items or to equip an item on a champion without many intervening steps and without a pop-up interface that can distract the player from the real-time combat. During combat, an item (e.g., bow, sword, arrows) can be dropped by one of the champions of the opposing team when defeated. The item could also be a spawn item, which can be triggered when certain criteria are met such as when the player has attained a certain rank, a certain amount of gold collected, a certain number of consecutive battles won, etc. Items can also randomly spawn.

FIG. 2A illustrates interface 100 with items 205, 210, and 215 in play. Item 205 can be an item dropped by a defeated champion belonging to the remote player. The local player can pick up item 205 by dragging it over to inventory area 125. Alternatively, the local player can double click on item 205 and have it automatically stored in inventory area 125. Collected items 210 and 215 are shown in inventory area 125.

FIG. 2B illustrates how to equip an item or to combine an item with an item currently equipped by a champion. As shown in FIG. 2B, item 215 has been dragged over to champion 220. While item 215 hovers over champion 220, a small information (or preview) window 225 can be displayed. Information window 225 can contain equipped item data such as item statistics (e.g., damage, weapon and/or armor bonus, item name, item type, item bonus, combination bonus), description, and effects when equipped by the character over which item 215 is hovering. The equipped item data can be the same regardless of the champion's class and/or origin. In some embodiments, the equipped item data can change based at least one the champion's class and/or origin. For example, the equipped item data of a sword can be very different between a warrior and a ranger. Although both types of champions can equip a sword, the sword may have an associated damage bonus for a warrior class champion.

Using information window 225, the user can quickly ascertain whether to equip item 215 on champion 220. The user can move item 215 to a different champion such as champion 230 to invoke another window 225 with different equipped item data that is specific for champion 230. After quickly hovering item 215 over various champions, the user can determine which type of special power or effect is desired for the champion. As shown, once champion 220 is equipped with item 215, champion will gain the ability of "Rapid Firecannon" with +20 damage and/or defense bonuses (e.g., 50% chance of a counter-attack), for example. In addition, champion 220 attacks cannot be dodged by the opposing team. If this is the desired effect/power, the user can simply drop item 215 over champion 220, and champion 200 will be instantly upgraded as described in the equipped item data. In some embodiments, information window 225 can be transparent or semi-transparent such that some portion of the background is visible through window 225.

Figure 3:
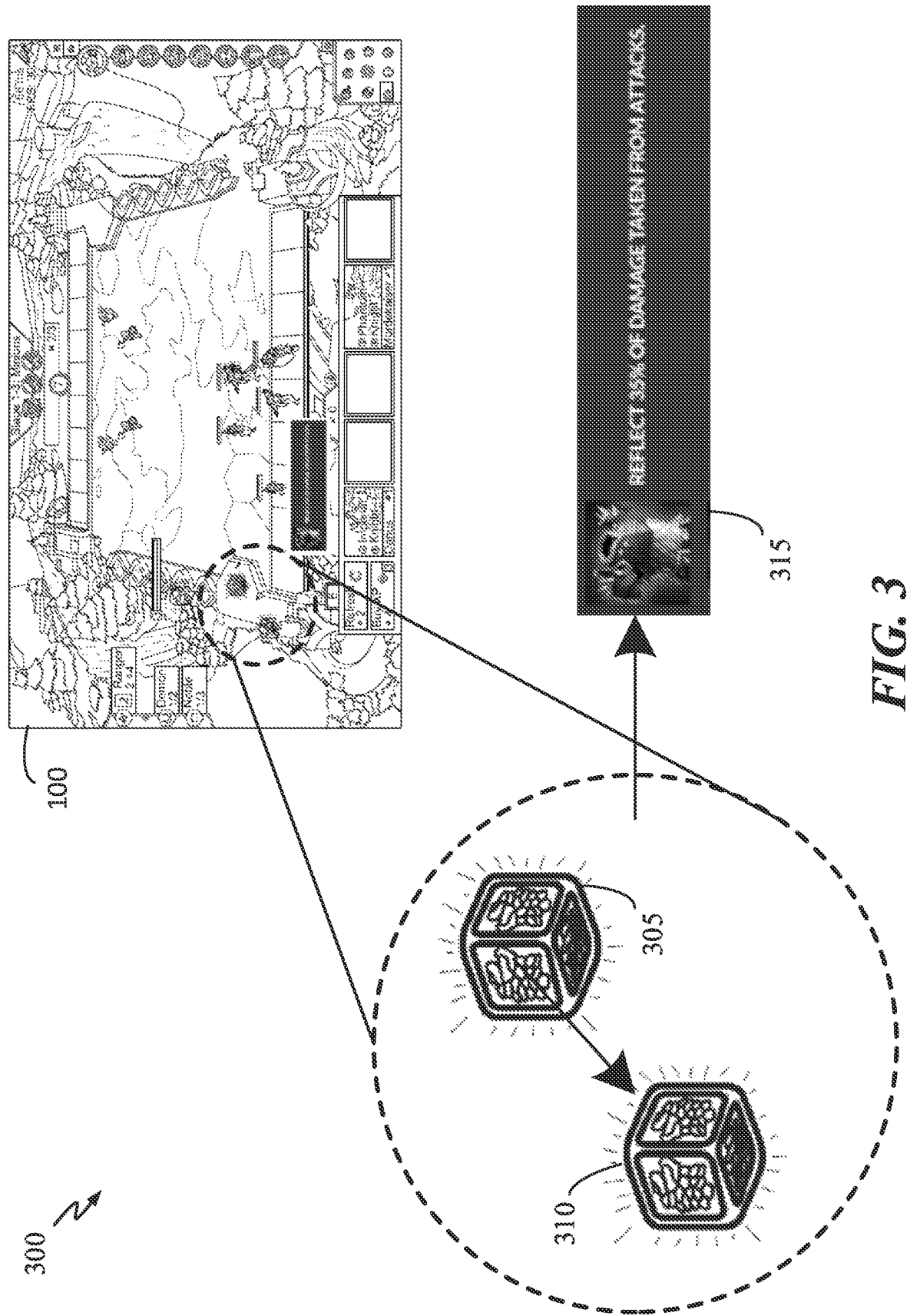
FIG. 3 is an example graphical depiction of how items can be combined in accordance with some aspects of the disclosure.

FIG. 3 graphically illustrates an item combination process 300 in accordance with some embodiments of the present disclosure. In FIG. 3, a real-time battle is shown in progress, and the local player has collected two items 305 and 310, both of which are identical items. In this example, items 305 and 310 are both chainmail armor. Using conventional item combination methods, one or more of items 305 and 310 have to be in one of the champions inventory bag and/or be equipped by the champion. To do this, an inventory window for the specific champion has to be shown in a pop-up window. Next, the player can don the first chainmail and select a second chainmail to combine with the first chainmail while the pop-up inventory window is displayed. Once the combination of the two chainmail armors is completed, the pop-up window is closed, thereby giving the player an obstructed view of the battlefield again. If the player changes her mind and does not want to combine the two chainmail armors and instead wants to combine the chainmail armors on a different character, the player would have to repeat the entire process again with another champion. Each time the process is repeated for another champion, a pop-up window would be displayed for that champion and each time the player's view of the battlefield would be blocked and precious time would be lost.

Process 300 enables the player to combine items without the need to equip or open an inventory bag for a specific champion. The items can be combined directly from interface 100 by clicking and dragging an item on top of the other item. When hovering an item over another item, an unobtrusive window is displayed to display information about the combined item. An example of hovering is when item 305 is dragged over item 310 but not released. When item 305 hovers over item 310, a combined-item window 315 can be displayed, which shows general data (e.g., item picture, name) and statistics of the combined item. As shown in FIG. 3, combining items 305 and 310 would yield a new armor that can reflect 35% of damage taken from attacks. If the player chooses to perform the combination, the player simply releases item 305 on top of item 310 and a new armor item will be generated. The new armor item can appear in inventory area 125.

Items that are currently being equipped by a champion can reappear in inventory area 125 if the champion is sold (to store 115) or transferred to another player. In some embodiments, equipped items cannot be sold along with a champion. Once the champion is sold, items that reappear in inventory area 125 can be combined and/or equipped on another champion. Alternatively, both the champion and equipped items can be sold for an augmented price.

Figure 4:
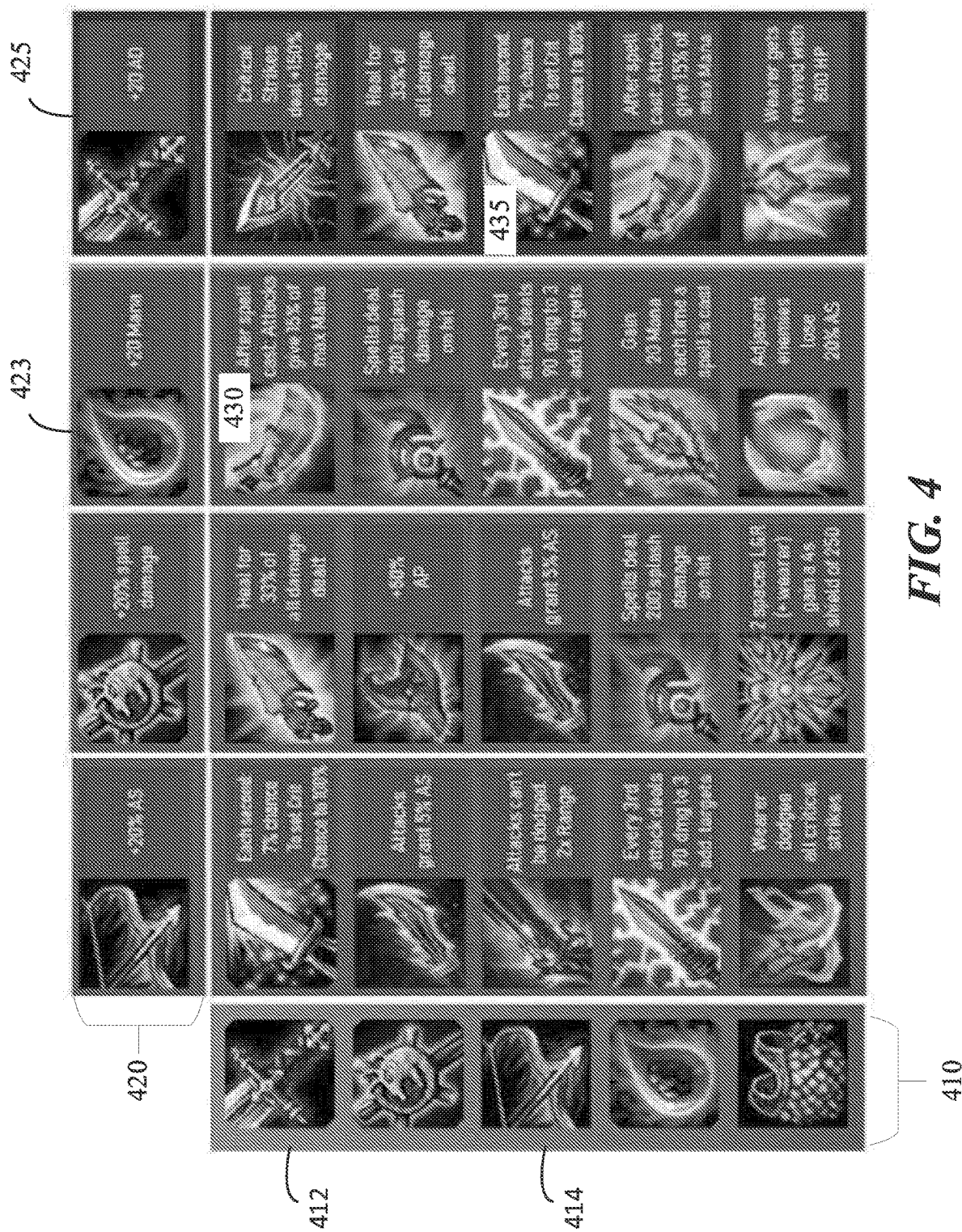
FIG. 4 is a grid illustrating example item combinations.

FIG. 4 illustrates an item combination grid 400 showing the potential effects and/or items as a result of combining two items from column 410 and row 420. For example, combining item 412 (blue sword) with item 423 (blue mana) would yield effect 430, "attacks give 15% of max mana." In another example, combining item 414 (bow) with sword 425 (which is identical to item 412) would give the player obtain the effect "each second, 7% chance to set critical hit to 100%". It should be noted that the effect/item obtained can be assigned to a champion by clicking and dragging the new item onto the champion. Although FIG. 4 only shows the combinations of 5 different items, the number of combinable items in the games can be in the hundreds. Additionally, any two items can be combined to create another item that exhibits one or more useful attributes. In this way, players can freely combine any two items to discover new items and effects.

Figure 5:
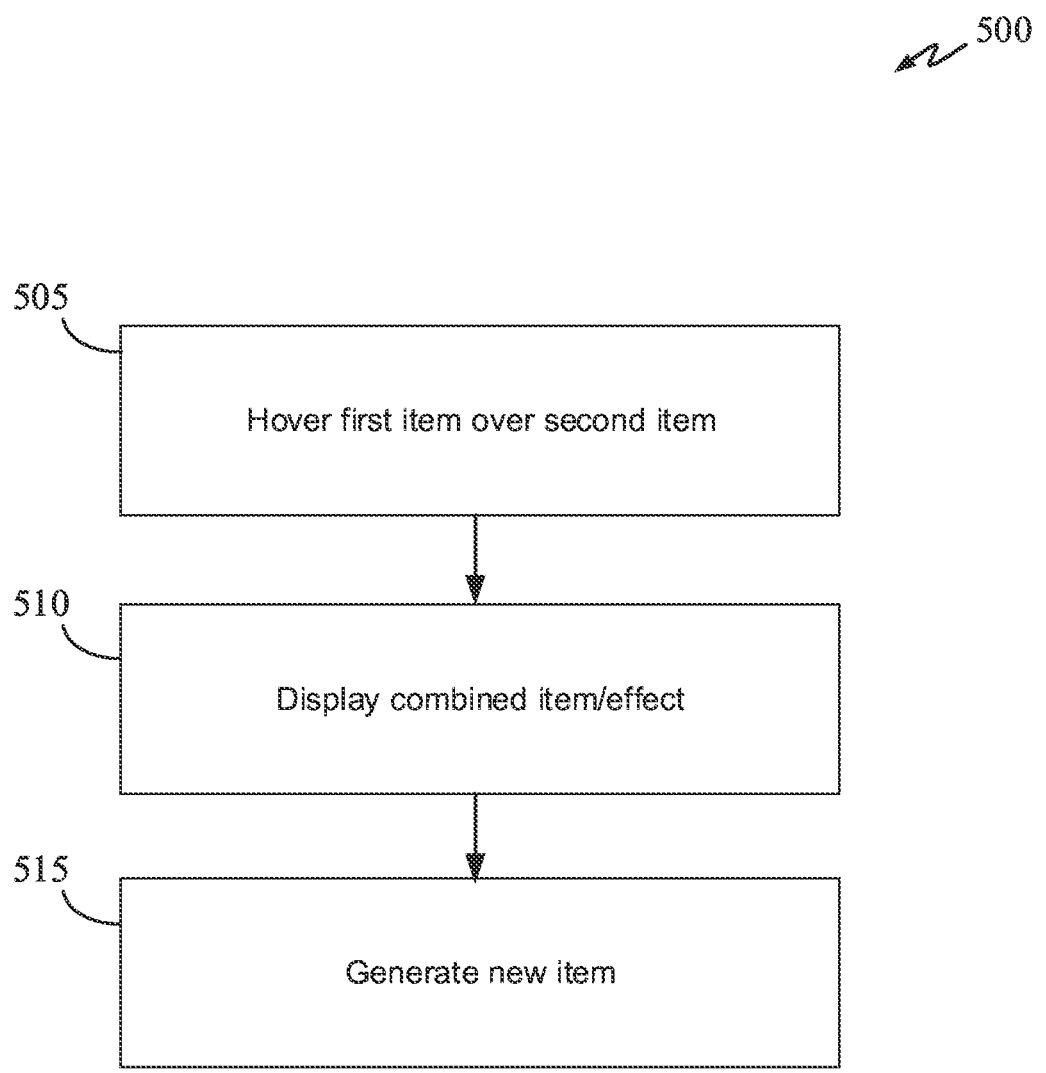
FIG. 5 is a process flow chart for combining items in accordance with some aspects of the disclosure.

FIG. 5 is a flow chart of process 500 for combining items in accordance with some embodiments of the present disclosure. Process 500 starts at 505 where a first item is selected and dragged on top of a second item. The first and second items can be any game items such as weapons, trinkets, ingredients (e.g., plants, flowers, animal parts), scrolls, gem stones, armors, and other intangibles (e.g., mana modifier, stamina modifier, aggression modifier). While the first item is held over the second item (e.g., hovering), a combined-item window is displayed at 510. The combined-item window can display information about the new combined item and/or effect. The combined-item window can be semi-transparent and can be displayed such that it would not obstruct the current battle in progress. Once the player confirms the combination of the selected items by releasing the first item over the second item, a new combined item can be generated at 515. The new item can be generated and displayed in inventory area 125. In some embodiments, the new generated area can be automatically equipped by a champion that can make best use of the new item. For example, if a combined item provides a 200% increase in mana or mana regeneration rate, then the auto-equip module can automatically equip the new mana regeneration item to the only mage on the battlefield. This auto-equip module can be enabled or disabled by the player. In situations where multiple champions can equip the new items, the auto-equip module can make a recommendation by highlighting the recommended champion.

Figure 6A:
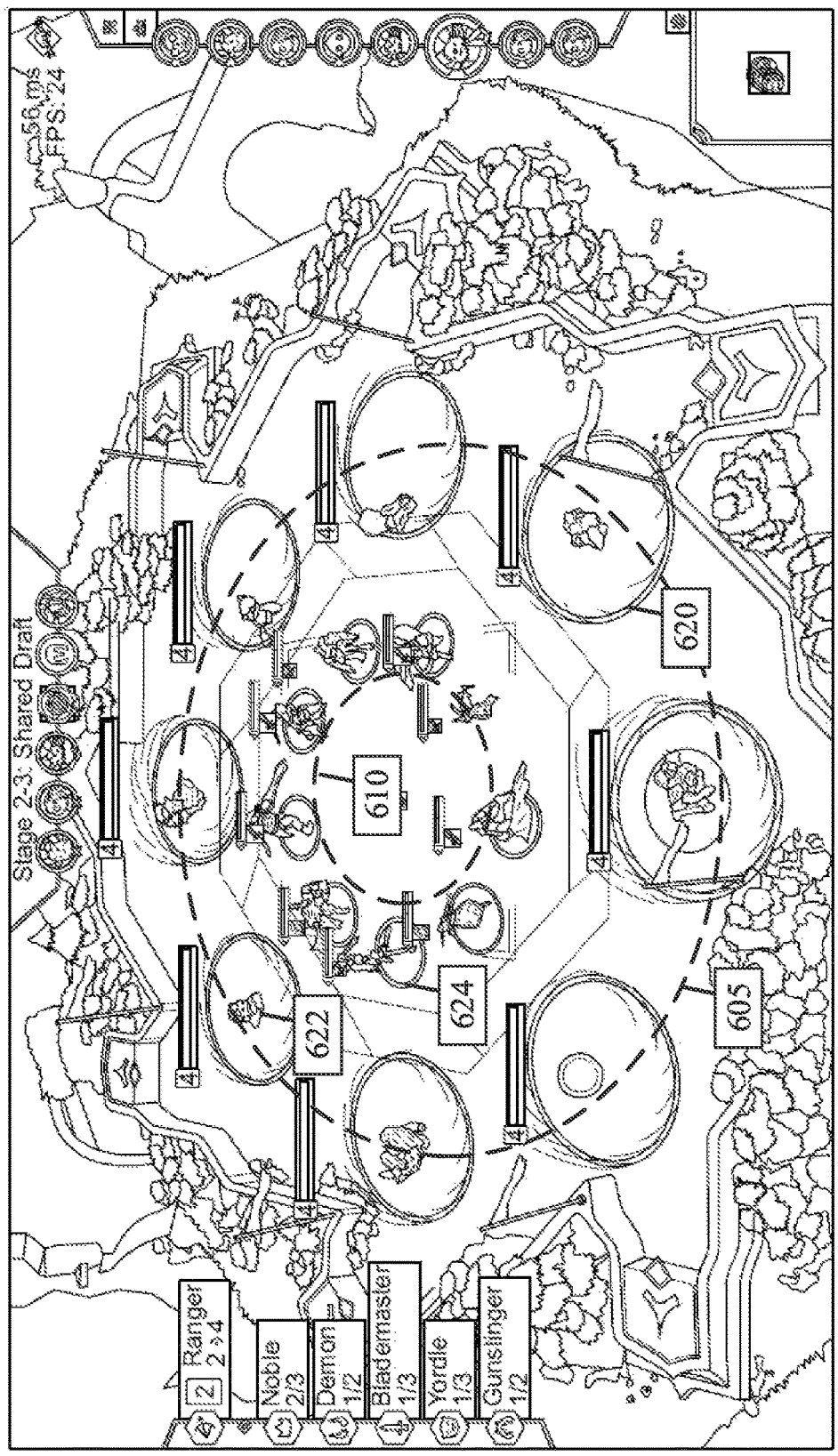
FIGS. 6A and 6B are example interfaces that enable players to draft champions and build a team in accordance with some aspects of the disclosure.

FIG. 6A illustrates an example interface 600 for the shared-draft round that enables players to build a new team in accordance with some embodiments of the present disclosure. Shared-draft interface 600 can include a player lineup perimeter 605 and a champion lineup perimeter 610. Each of the player lineup perimeters 605 and 610 can be a circle, a half circle, a square, a triangle, a polygon, an incomplete polygon, or a line. In some embodiments, the champion lineup perimeter 610 can be inside of the player lineup perimeter 605. Alternatively, the player lineup perimeter 605 can be partially or completely surrounded by champion lineup perimeter 610. Lineup perimeter 605 can have two or more players (e.g., 2, 4, 6, 8, 10, 20) displayed simultaneously. In some embodiments, lineup perimeter 605 can have a maximum of eight players. Lineup perimeter 610 can have two or more (e.g., 8) selectable champions. The number of selectable champions can be the equal to or greater than the number of players in lineup perimeter 605.

The selectable champions in lineup perimeter 610 can be populated randomly or it can be based on the number of players in lineup perimeter 605. The type of champions in lineup perimeter 610 can also be populated based on attributes (e.g., rank, experiences, type of player) of one or more players of lineup perimeter 605. For example, if there is a large gap between ranking and experiences of a group of players as compared to another, then the level of champions populated in lineup perimeter 610 can also vary accordingly. In this way, lower ranked players (who get to select champions first) have a greater chance of building a competitive team that can match or have a better chance against the better players.

In some embodiments, each player is surrounded by a drafting barrier that restricts the movement of each player. The barrier of each player can be configured to open based at least on one or more attributes of each player such as health and/or experiences. For example, drafting barriers for players with lower health and/or experiences can open before the drafting barriers for players with more health and/or experiences. For instance, given eight players, the drafting barrier can for each player can open in the following order: 8th ranked player, 7th ranked player, 6th ranked player, 5th ranked player, 4th ranked player, 3rd ranked player, 2nd ranked player, then 1st ranked player. This low-to-high ranking drafting barrier opening order helps level the playing field by giving opportunities to lower ranked players to select a stronger or better champion for their team. In some embodiments, the drafting order can be random. The drafting order can also be determined randomly, e.g., based on dice rolls, where each player rolls a pair of dice to determine who gets to draft first.

Once the drafting window for a player opens, the player can then move and run to one of the champions in lineup perimeter 610 in order to grab and draft the champion onto her team. For example, as shown, player 615 is enclosed by barrier 620 and cannot move to lineup perimeter 610 until barrier 620 dissipates (e.g., opens) when the drafting window for player 615 opens. Only then can player 615 move about and move to the desired champion (by clicking on the desired champion) and draft the champion by touching it. For instance, the desired champion can be champion 624, which is far away from player 615. The drafting barrier for player 622 can open after the barrier for player 615 opens (e.g., after one or more seconds). But because champion 624 is much closer to player 622, player 615 will unlikely get to champion 624 before player 622 reaches champion 624. This is the chance and luck aspect of the drafting process.

Each champion in lineup perimeter 610 can move (e.g., rotate) along perimeter 610 during the drafting stage. Each champion can showcase their specialty (e.g., spells, fighting techniques, and items). This can help the players make a decision on which champion to select. During the drafting stage, each player can select one or more champions in each round. The drafting stage can have one or more drafting rounds. Each player in lineup perimeter 605 can be represented by an avatar (e.g., little Legends), which can be selected by the player. In some embodiments, a predetermined amount of time can be given to each player to select a champion for her team. For example, a player can have 30 seconds to select a champion or one will automatically be selected for the player when time is up.

In some embodiments, champions can move about lineup perimeter 610 in a random fashion. For example, each champion can move in a zig-zag or unpredictable pattern to make the drafting process even more dynamic and interactive. Each champion can also move at different speed or stay at one location for a brief period of time. Each champion can also teleport to a random location within lineup perimeter 610.

Figure 6B:
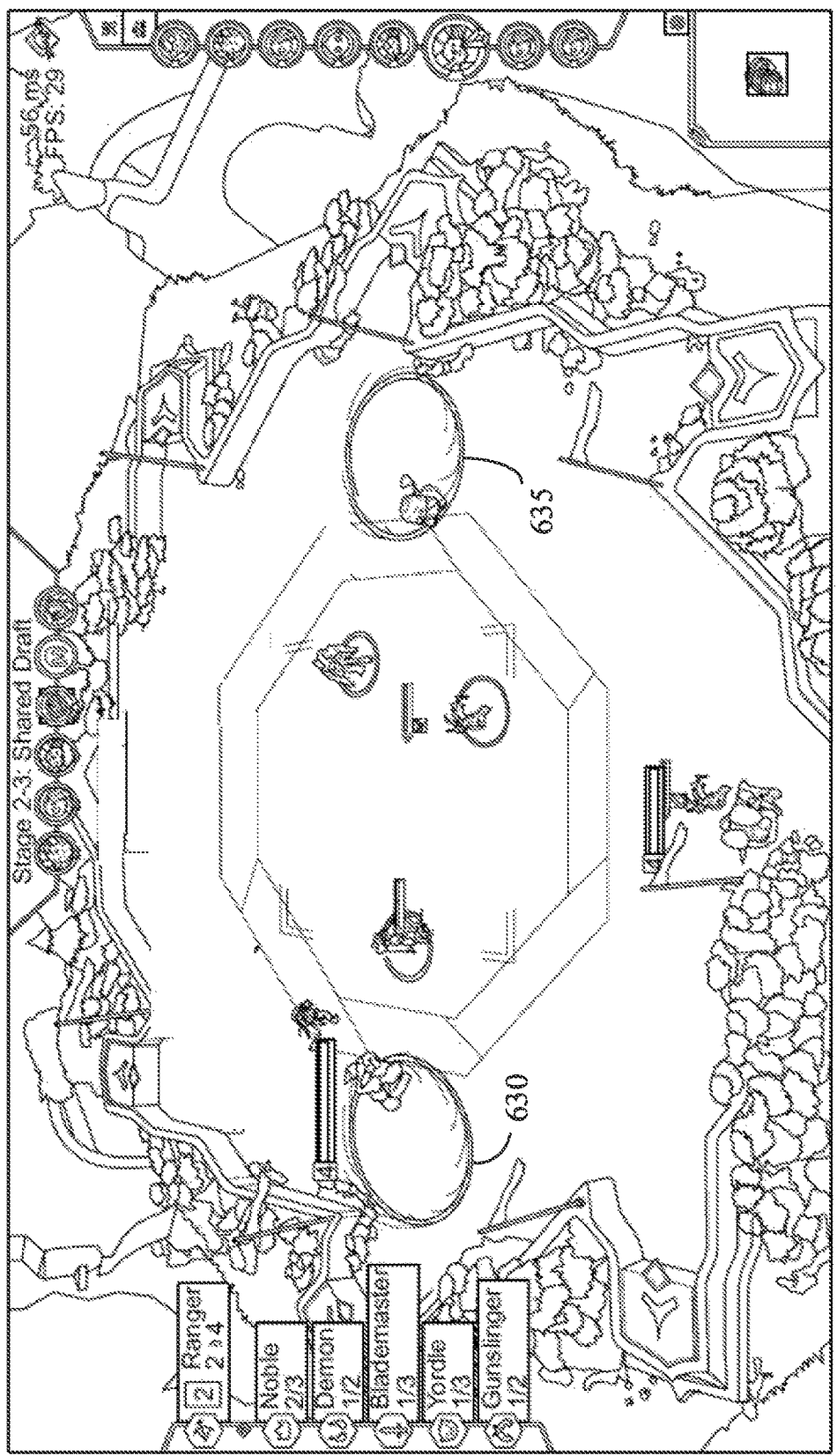

FIG. 6B illustrates a stage of shared-draft interface 600 where only two players remain to draft in the current round of drafting. As previously mentioned, the highest ranked player can be the last player to draft. Here, players 630 and 635 are the two highest ranking player. Thus, players 630 and 635 are the last two players that can draft champions from lineup perimeter 610, which now has only three champions left for players 630 and 635 to choose from.

Figure 7A:
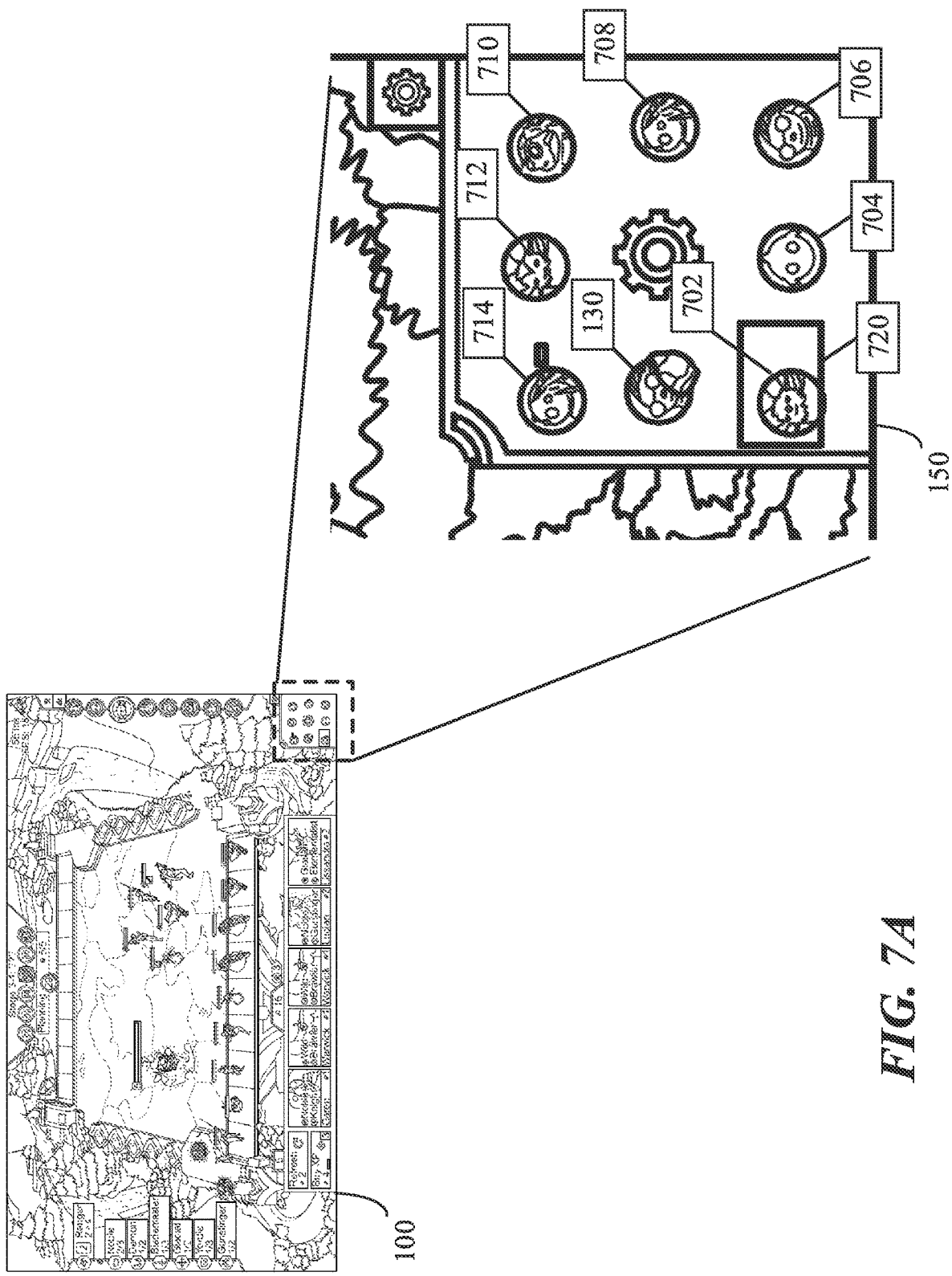
FIG. 7A is an example graphical interface with an arena mini-map in accordance with some aspects of the disclosure.

FIG. 7A is a closeup view of mini-map 150 in accordance with some embodiments of the present disclosure. Mini-map 150 includes avatars (702 through 714) of all the players in the current game. Box 720 around avatar 720 indicates the current view of interface 100. In other words, interface 100 is currently showing the battlefield for the player represented by avatar 702. The player can switch view and observe another arena by clicking on the desired avatar. Each player has her own unique battlefield. Thus, whenever a different avatar is selected, the current view of the local player can change to the perspective of the selected player, which can be a remote player. Mini-map 150 also enables user to observe the champions or team of other players simply by selecting the desired avatar. During game play, a player can also observe live battles of other players by selecting the desired avatar.

Figure 7B:
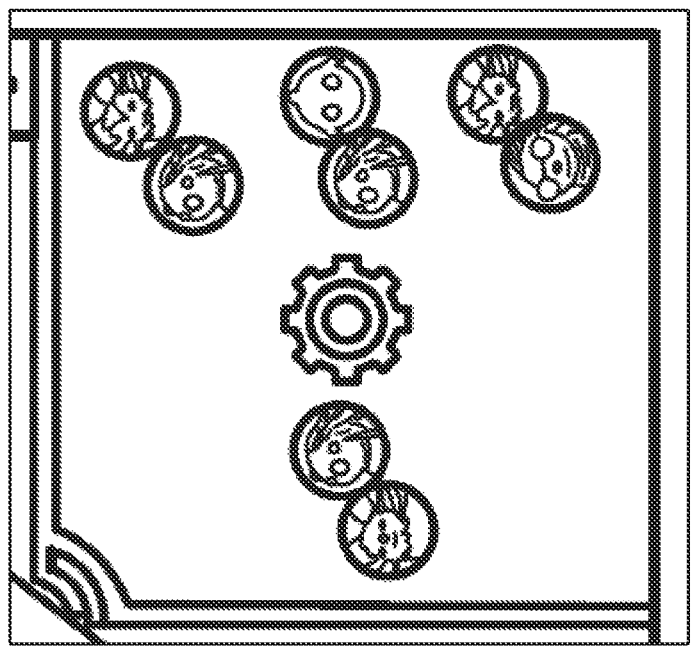
FIG. 7B is a closeup view of the arena mini-map of FIG. 7A.

FIG. 7B illustrates how avatars are paired to illustrate which player is battling against which player. Using mini-map 150, a player can quickly choose which battle to observe. Once an avatar pair is selected, the interface of the local player can display the live battle between the selected avatars. To select a specific vantage point (i.e., view from a specific player), the local player can click on the specific avatar icon. This can turn the local player's interface to see what the player of the selected avatar is seeing.

It should be noted that the order of various events and/or stages described above can have a different order and/or be reversed without departing from the spirit and scope of the present disclosure. For example, players can first be transported to the arenas of the host players before the planning stage can take place. In another example, a second drafting stage can occur after a first synchronous battle.

Example Systems

Figure 8:
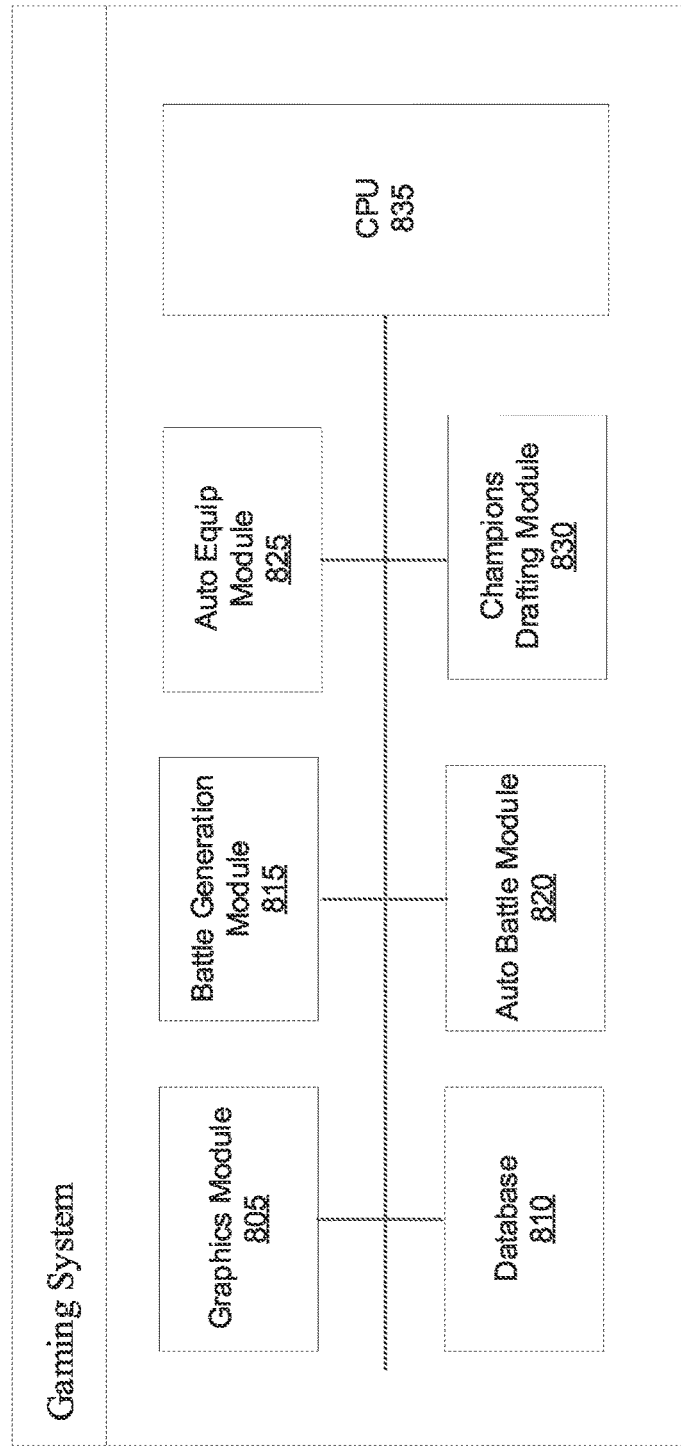
FIG. 8 is a block diagram illustrating the gaming system in accordance with some aspects of the disclosure.

FIG. 8 is a system diagram of an exemplary gaming system 800, which can include a graphic module 805, a database 810, a battle generation module 815, an auto battle module 820, an auto equip module 825, a champions drafting module 830, and a processor 835. System 800 may reside on a single server or may be distributed at various locations on a network. For example, one or more components or modules (e.g., 805, 810, 815, 820, 825, 830) of system 800 may be distributed across various locations throughout a network. Each component or module of system 800 may communicate with each other and with external entities via communication module 830. Each component or module of system 800 may include its own sub-communication module to further facilitate with intra and/or inter-system communication.

Graphics module 805 includes algorithms and instructions that, when executed by processor 835, cause the processor to render graphical interfaces and features as shown and described in FIGS. 1A, 1B, 1C, 1D, 2A, 2B, 3, 6A, 6B, 7A, and 7B.

Database 810 can include players data, champions data, in-game items data, etc. For example, database 810 can include a player information, team composition, items inventory, rank, score, health, etc.

Battle generation module 815 includes algorithms and instructions that, when executed by processor 835, cause the processor to match players and coordinate battles between the various players. Battle generation module 815 can also include algorithms and instructions to enable each of the plurality of players to create a team of champions (which can be unique to each player); and create a one or more real-time battles between a plurality of human players.

Autobattler module 820 includes algorithms and instructions that, when executed by processor 835, cause the processor to automatically manage champions during the live battle to achieve the best possible outcome given the composition of the team, items acquired, champions position on the battlefield, etc.

Auto equip module 825 includes algorithms and instructions that, when executed by processor 835, cause the processor to suggest or automatically equip an item the player collected on the battlefield. The player may not have time to properly match the item with the appropriate champions. This task can be delegated to the auto equip module 825, which can make recommendation on which champion on the player's team to equip a particular item found in the game.

Champion drafting module 830 includes algorithms and instructions that, when executed by processor 835, cause the processor to manage the drafting process as described and shown in FIGS. 6A and 6B.

Figure 9:
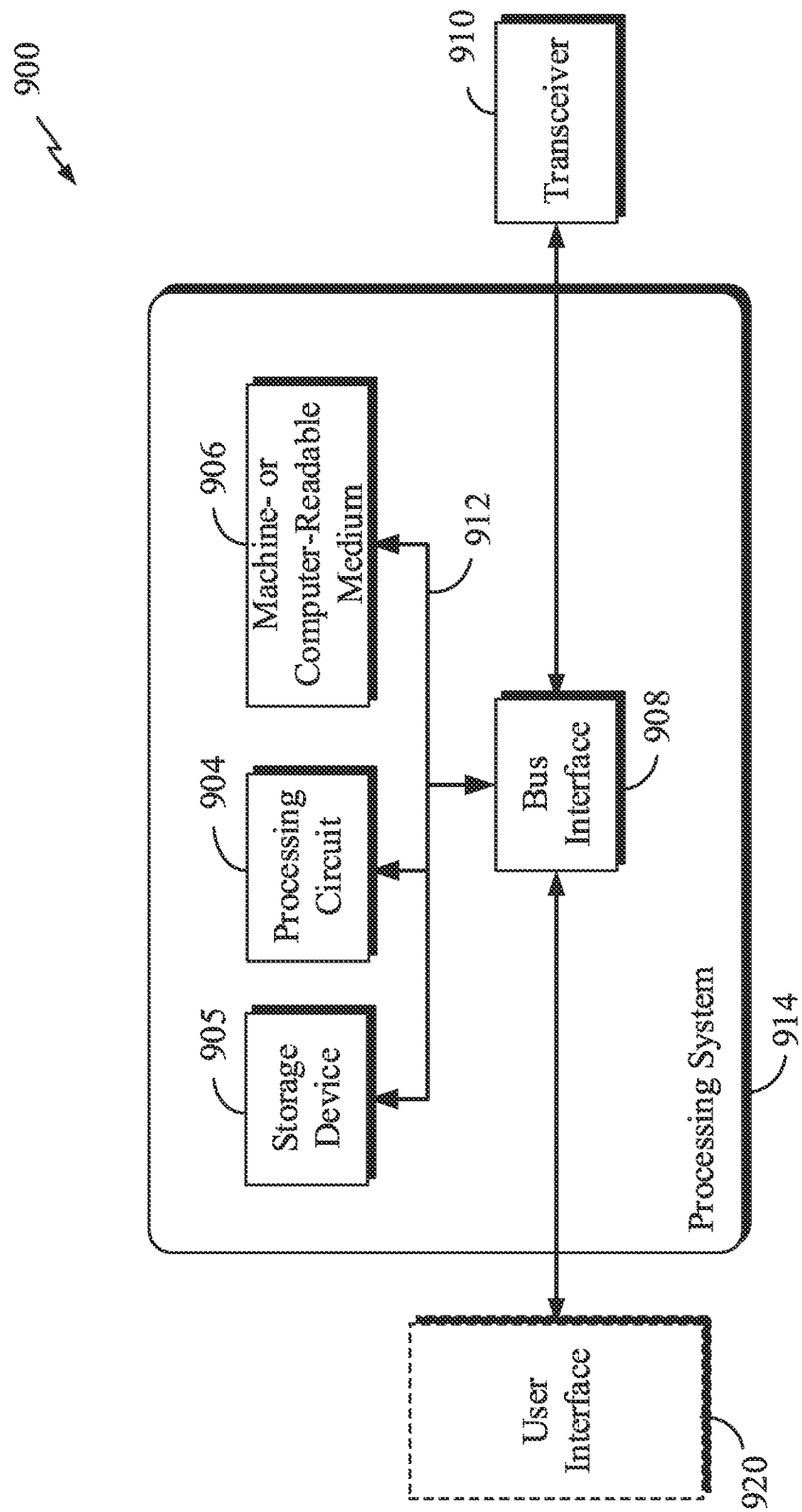
FIG. 9 is a diagram illustrating an exemplary hardware implementation of the gaming system illustrated in FIGS. 1 through 8 in accordance with some aspects of the disclosure.

FIG. 9 illustrates an exemplary system or apparatus 900 in which graphical features of FIGS. 1 through 4 (include sub-figures), 6, and 7 and process 500 can be implemented. In accordance with various aspects of the disclosure, an element, or any portion of an element, or any combination of elements may be implemented with a processing system 914 that includes one or more processing circuits 904. Processing circuits 904 may include micro-processing circuits, microcontrollers, digital signal processing circuits (DSPs), field programmable gate arrays (FPGAs), programmable logic devices (PLDs), state machines, gated logic, discrete hardware circuits, and other suitable hardware configured to perform the various functionalities described throughout this disclosure. That is, the processing circuit 904 may be used to implement any one or more of graphical features and processes described above and illustrated in FIGS. 1 through 7 (including sub-figures).

In the example of FIG. 9, the processing system 914 may be implemented with a bus architecture, represented generally by the bus 902. The bus 902 may include any number of interconnecting buses and bridges depending on the specific application of the processing system 914 and the overall design constraints. The bus 902 may link various circuits including one or more processing circuits (represented generally by the processing circuit 904), the storage device 905, and a machine-readable, processor-readable, processing circuit-readable or computer-readable media (represented generally by a non-transitory machine-readable medium 906). The bus 902 may also link various other circuits such as, but not limited to, timing sources, peripherals, voltage regulators, and power management circuits, which are well known in the art, and therefore, will not be described any further. The bus interface 908 may provide an interface between bus 902 and a transceiver 910. The transceiver 910 may provide a means for communicating with various other apparatus over a transmission medium. Depending upon the nature of the apparatus, a user interface 920 (e.g., keypad, display, speaker, microphone, touchscreen, motion sensor) may also be provided.

The processing circuit 904 may be responsible for managing the bus 902 and for general processing, including the execution of software stored on the machine-readable medium 906. The software, when executed by processing circuit 904, causes processing system 914 to perform the various functions described herein for any particular apparatus. Machine-readable medium 906 may also be used for storing data that is manipulated by processing circuit 904 when executing software.

One or more processing circuits 904 in the processing system may execute software or software components. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A processing circuit may perform the tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory or storage contents. Information, arguments, parameters, data, etc. may be passed, forwarded, or transmitted via any suitable means including memory sharing, message passing, token passing, network transmission, etc.

The software may reside on machine-readable medium 906. The machine-readable medium 906 may be a non-transitory machine-readable medium. A non-transitory processing circuit-readable, machine-readable or computer-readable medium includes, by way of example, a magnetic storage device (e.g., solid state drive, hard disk, floppy disk, magnetic strip), an optical disk (e.g., digital versatile disc (DVD), Blu-Ray disc), a smart card, a flash memory device (e.g., a card, a stick, or a key drive), RAM, ROM, a programmable ROM (PROM), an erasable PROM (EPROM), an electrically erasable PROM (EEPROM), a register, a removable disk, a hard disk, a CD-ROM and any other suitable medium for storing software and/or instructions that may be accessed and read by a machine or computer. The terms "machine-readable medium", "computer-readable medium", "processing circuit-readable medium" and/or "processor-readable medium" may include, but are not limited to, non-transitory media such as, but not limited to, portable or fixed storage devices, optical storage devices, and various other media capable of storing, containing or carrying instruction(s) and/or data. Thus, the various methods described herein may be fully or partially implemented by instructions and/or data that may be stored in a "machine-readable medium," "computer-readable medium," "processing circuit-readable medium" and/or "processor-readable medium" and executed by one or more processing circuits, machines and/or devices. The machine-readable medium may also include, by way of example, a carrier wave, a transmission line, and any other suitable medium for transmitting software and/or instructions that may be accessed and read by a computer.

The machine-readable medium 906 may reside in the processing system 914, external to the processing system 914, or distributed across multiple entities including the processing system 914. The machine-readable medium 906 may be embodied in a computer program product. By way of example, a computer program product may include a machine-readable medium in packaging materials. Those skilled in the art will recognize how best to implement the described functionality presented throughout this disclosure depending on the particular application and the overall design constraints imposed on the overall system.

One or more of the components, processes, features, and/or functions illustrated in the figures may be rearranged and/or combined into a single component, block, feature or function or embodied in several components, steps, or functions. Additional elements, components, processes, and/or functions may also be added without departing from the disclosure. The apparatus, devices, and/or components illustrated in the Figures may be configured to perform one or more of the methods, features, or processes described in the Figures. The algorithms described herein may also be efficiently implemented in software and/or embedded in hardware.

Note that the aspects of the present disclosure may be described herein as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and processes have been described above generally in terms of their functionality. Whether such functionality is implemented as hardware or software depends upon the particular application and design constraints imposed on the overall system.

The embodiments described above are considered novel over the prior art and are considered critical to the operation of at least one aspect of the disclosure and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described above are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

In the foregoing description and in the figures, like elements are identified with like reference numerals. The use of "e.g.," "etc.," and "or" indicates non-exclusive alternatives without limitation, unless otherwise noted. The use of "including" or "includes" means "including, but not limited to," or "includes, but not limited to," unless otherwise noted.

As used above, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B", when used in conjunction with open-ended language such as "comprising" can refer, in one embodiment, to A only (optionally including entities other than B); in another embodiment, to B only (optionally including entities other than A); in yet another embodiment, to both A and B (optionally including other entities). These entities may refer to elements, actions, structures, processes, operations, values, and the like.

What is claimed is:

1. A computer-implemented method for hosting autobattler matches, the method comprising:

generating, by a gaming server, an avatar for each player of a plurality of players, each player of the plurality of players having a corresponding team of champions;

creating, by the gaming server, a plurality of synchronous real-time battles, each synchronous real-time battle of the plurality of synchronous real-time battles being created on a home arena associated with one of the plurality of players, each synchronous real-time battle having the team of champions corresponding to one of a plurality of host players of the plurality of players and another team of champions corresponding to one of a plurality of visiting players of the plurality of players; and enabling, by the gaming server, each player of the plurality of players to control the player's avatar within the host arena of one of the plurality of host players during the plurality of synchronous real-time battles.

2. The method of claim 1, wherein to control the player's avatar includes manually moving the avatar around the host arena.

3. The method of claim 2, wherein to control the player's avatar includes causing the avatar to cheer, taunt, and/or show respect to an opponent in the synchronous real-time battle.

4. The method of claim 2, wherein the avatar is different from the corresponding team of champions.

5. The method of claim 4, wherein actions of the corresponding team of champions is automatically performed.

6. The method of claim 1, wherein the corresponding team of champions is selected by the player.

7. The method of claim 1, wherein each home arena is customizable by one of the plurality of players.

8. A non-transitory computer storage medium storing computer-useable instructions that, when used by one or more computing devices, cause the one or more computing devices to perform operations comprising:

generating an avatar for each player of a plurality of players, each player of the plurality of players having a corresponding team of champions;

creating a plurality of synchronous real-time battles, each synchronous real-time battle of the plurality of synchronous real-time battles being created on a home arena associated with one of the plurality of players, each synchronous real-time battle having the team of champions corresponding to one of a plurality of host players of the plurality of players and another team of champions corresponding to one of a plurality of visiting players of the plurality of players; and enabling each player of the plurality of players to control the player's avatar within the host arena of one of the plurality of host players during the plurality of synchronous real-time battles.

9. The medium of claim 8, wherein to control the player's avatar includes manually moving the avatar around the host arena.

10. The method of claim 9, wherein to control the player's avatar includes causing the avatar to cheer, taunt, and/or show respect to an opponent in the synchronous real-time battle.

11. The method of claim 9, wherein the avatar is different from the corresponding team of champions.

12. The method of claim 11, wherein actions of the corresponding team of champions is automatically performed.

13. The method of claim 8, wherein the corresponding team of champions is selected by the player.

14. The method of claim 8, wherein each home arena is customizable by one of the plurality of players.

15. A computerized system comprising:
one or more processors; and
one or more computer storage media storing computer-usable instructions that, when used by the one or more processors, cause the one or more processors to:

generate an avatar for each player of a plurality of players, each player of the plurality of players having a corresponding team of champions;

create a plurality of synchronous real-time battles, each synchronous real-time battle of the plurality of synchronous real-time battles being created on a home arena associated with one of the plurality of players, each synchronous real-time battle having the team of champions corresponding to one of a plurality of host players of the plurality of players and another team of champions corresponding to one of a plurality of visiting players of the plurality of players; and enable each player of the plurality of players to control the player's avatar within the host arena of one of the plurality of host players during the plurality of synchronous real-time battles.

16. The system of claim 15, wherein to control the player's avatar includes manually moving the avatar around the host arena.

17. The system of claim 16, wherein to control the player's avatar includes causing the avatar to cheer, taunt, and/or show respect to an opponent in the synchronous real-time battle.

18. The method of claim 16, wherein the avatar is different from the corresponding team of champions.

19. The method of claim 18, wherein actions of the corresponding team of champions is automatically performed.

20. The method of claim 15, wherein the corresponding team of champions is selected by the player.

* * * * *

UNITED STATES PATENT AND TRADEMARK OFFICE
CERTIFICATE OF CORRECTION

Page 1 of 2

PATENT NO. : 12,128,319 B2
APPLICATION NO. : 17/868316
DATED : October 29, 2024
INVENTOR(S) : David Abecassis It is certified that error appears in the above-identified patent and that said Letters Patent is hereby corrected as shown below:

In the Claims

Column No. 20, Line No. 4, Claim No. 10:
The line reading "The method of claim 9, wherein to control the player's" should read -- The medium of claim 9, wherein to control the player's --.

Column No. 20, Line No. 8, Claim No. 11:
The line reading "The method of claim 9, wherein the avatar is different" should read -- The medium of claim 9, wherein the avatar is different --.

Column No. 20, Line No. 10, Claim No. 12:
The line reading "The method of claim 11, wherein actions of the" should read -- The medium of claim 11, wherein actions of the --.

Column 20, Line No. 13, Claim No. 13:
The line reading "The method of claim 8, wherein the corresponding" should read -- The medium of claim 8, wherein the corresponding --.

Column 20, Line No. 15, Claim No. 14:
The line reading "the method of claim 8, wherein each home arena is" should read -- the medium of claim 8, wherein each home arena is --.

Column 20, Line No 45, Claim 18:
The line reading "The method of claim 16, wherein the avatar is" should read -- The system of claim 16, wherein the avatar is --.

Column 20, Line 47, Claim No. 19:
The line reading "The method of claim 18, wherein actions of the" should read -- The system of claim 18, wherein actions of the --.

Signed and Sealed this
Seventeenth Day of December, 2024

Derrick Brent
*Acting Director of the United States Patent and Trademark Office*

Column 20, Line 50, Claim 20:
The line reading "The method of claim 15, wherein the corresponding" should read -- The system of claim 15, wherein the corresponding --.